United States Patent
Silveira

(10) Patent No.: US 11,053,963 B1
(45) Date of Patent: Jul. 6, 2021

(54) HOLDER

(71) Applicant: Cindy Silveira, New Haven, IN (US)

(72) Inventor: Cindy Silveira, New Haven, IN (US)

( * ) Notice: Subject to any disclaimer, the term of this patent is extended or adjusted under 35 U.S.C. 154(b) by 146 days.

(21) Appl. No.: 16/507,466

(22) Filed: Jul. 10, 2019

(51) Int. Cl.
*F16B 2/06* (2006.01)
*D05C 1/04* (2006.01)

(52) U.S. Cl.
CPC ............ *F16B 2/065* (2013.01); *D05C 1/04* (2013.01)

(58) Field of Classification Search
CPC .... F16B 2/065; F16B 2/02; F16B 2/12; F16B 5/06; F16B 2/06; D05C 1/00–04; D05C 9/00; A47B 97/00; A47B 97/02; B25B 5/00; B25B 5/02; B25B 5/06; B25B 5/10; B25B 5/102; B25B 5/163; B25B 5/166
See application file for complete search history.

(56) References Cited

U.S. PATENT DOCUMENTS

| | | | | |
|---|---|---|---|---|
| 866,195 | A * | 9/1907 | Dillman et al. | |
| 1,494,871 | A * | 5/1924 | Watkins | A47L 13/142 15/120.2 |
| 3,899,164 | A * | 8/1975 | Newman | D05C 1/02 269/71 |
| 3,906,648 | A * | 9/1975 | Bard | D05C 1/04 38/102.2 |
| 5,330,143 | A * | 7/1994 | Rich | D05C 1/02 223/120 |
| 5,357,699 | A * | 10/1994 | Padawer | A47B 29/00 248/124.1 |
| 5,771,613 | A * | 6/1998 | Geils | D05C 1/02 108/150 |
| 2006/0272565 | A1 | 12/2006 | Bowlus | |
| 2015/0259839 | A1 | 9/2015 | Iida | |

FOREIGN PATENT DOCUMENTS

GB 176179 A * 3/1922

* cited by examiner

*Primary Examiner* — Ismael Izaguirre
(74) *Attorney, Agent, or Firm* — Sanchelima & Associates, P.A.; Christian Sanchelima; Alexander Rodriguez

(57) ABSTRACT

A holder for holding an article, including but not limited to an embroidery hoop, is disclosed herein. The holder comprises a first block and a second block adjacently mounted to said first block. The holder further comprises a groove formed between said first block and said second block when said second block is fitted to said first block. Additionally, the groove is configured to hold an article such as an embroidery hoop within said groove. Furthermore, the holder comprises at least one fastener for facilitating fitment of said first block and said second block. The first block and second blocks include a pair of apertures that align when the first and second blocks are fitted together for allowing fasteners to be received therewithin for facilitating secure fitment of the first block and second blocks.

10 Claims, 5 Drawing Sheets

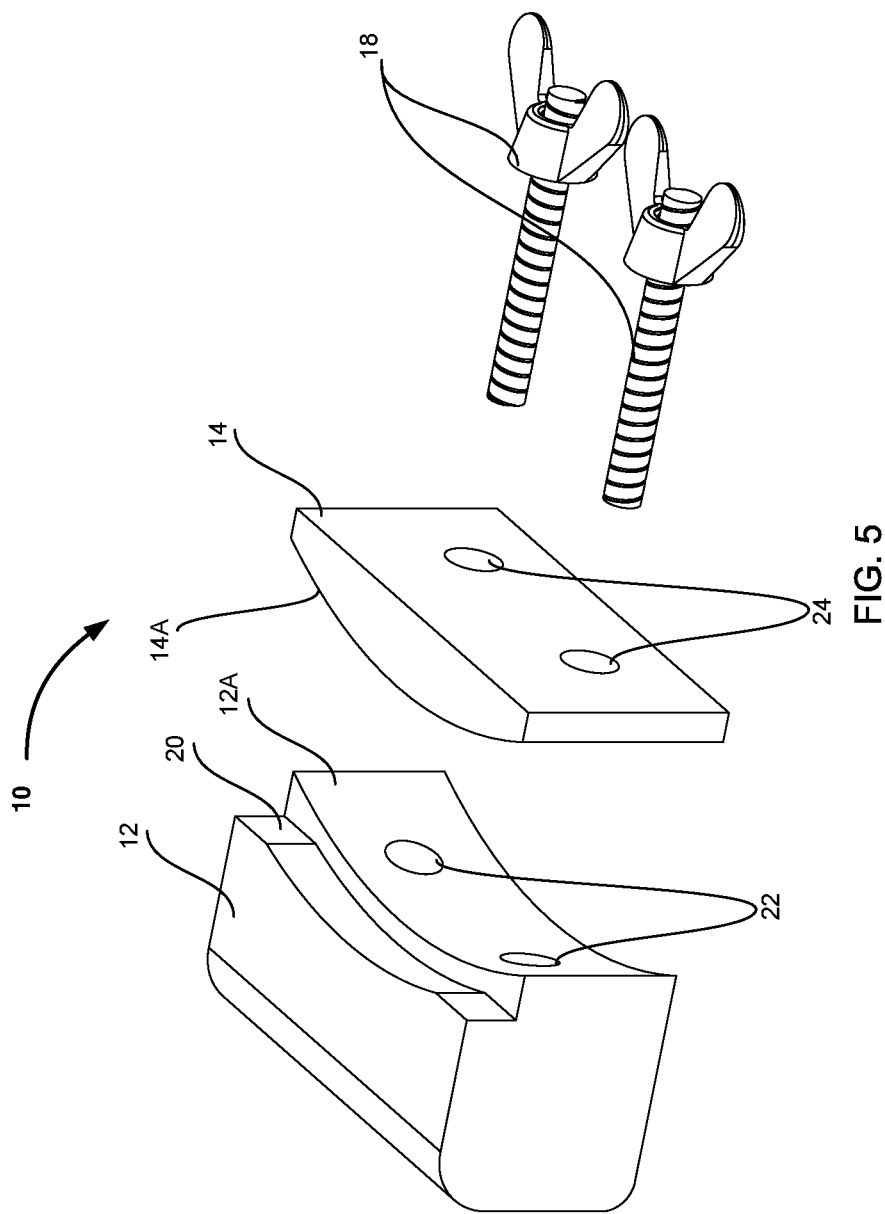

HOLDER

BACKGROUND OF THE INVENTION

1. Field of the Invention

The present invention relates to the field of holders. In particular, the present invention relates to a holder for conveniently holding article, including but not limited to, an embroidery hoop.

2. Description of the Related Art

Embroidery hoops are frames used to keep a fabric taut while an embroidery is being performed thereon. Typically, embroidery hoops are frames having a very small cross section which makes it unergonomic and uncomfortable to hold for longer durations required completing the embroidery on the fabric. This is not desired.

Several designs for embroidery hoop or embroidery hoop holders have been designed in the past. None of them, however, are known to have a simple configuration, which makes it easy for a user to conveniently hold the embroidery hoop while the embroidery is being performed on the fabric held within the hoop.

Applicant believes that a related reference corresponds to U.S. Patent Publication No. 20060272565 filed by MONIER BOWLUS. The Bowlus reference discloses a placement holder for embroidering patches. The placement holder fits inside an embroidery hoop for use in an automated embroidery machine and contains a cutout section in the shape of the patch. The patch is placed inside the cutout section of the holder, which aligns the patch with the needles of the embroidery machine. However, the apparatus disclosed in the Bowlus reference fails to disclose a holder having a simple configuration, which makes it easy for a user to conveniently hold the embroidery hoop while the embroidery is being performed on the fabric held within the hoop.

Applicant believes that another related reference corresponds to U.S. Patent Publication No. 20150259839 filed by MITSUHIRO IIDA. The Iida reference discloses a holder member that includes a planar portion, a mounting portion, a color reference member, and an affixing device. The planar portion has a surface that is planar. The mounting portion supports the planar portion. The mounting portion is also configured to be removably mounted on an embroidery frame moving mechanism of a sewing machine. However, Iida reference fails to disclose a holder having a simple configuration, which makes it easy for a user to conveniently hold the embroidery hoop while the embroidery is being performed on the fabric held within the hoop.

Other documents describing the closest subject matter provide for a number of more or less complicated features that fail to solve the problem in an efficient and economical way. None of these patents suggest the novel features of the present invention.

SUMMARY OF THE INVENTION

It is an object of the present invention to provide an embroidery hoop holder having a simple configuration.

It is another object of the present invention to provide an embroidery hoop holder which makes it easy for a user to conveniently hold the embroidery hoop while the embroidery is being performed on the fabric held within the hoop.

It is yet another object of the present invention to provide an embroidery hoop holder that alleviates the stress on a user's hand.

Further objects of the invention will be brought out in the following part of the specification, wherein detailed description is for the purpose of fully disclosing the invention without placing any limitations thereon.

BRIEF DESCRIPTION OF THE DRAWING

With the above and other related objects in view, the invention consists in the details of construction and combination of parts as will be more fully understood from the following description, when read in conjunction with the accompanying drawings in which:

FIG. 5 illustrates an exploded isometric view of holder 10, in accordance with an embodiment of the present invention.

DETAILED DESCRIPTION OF THE EMBODIMENTS OF THE INVENTION

Figure 1:
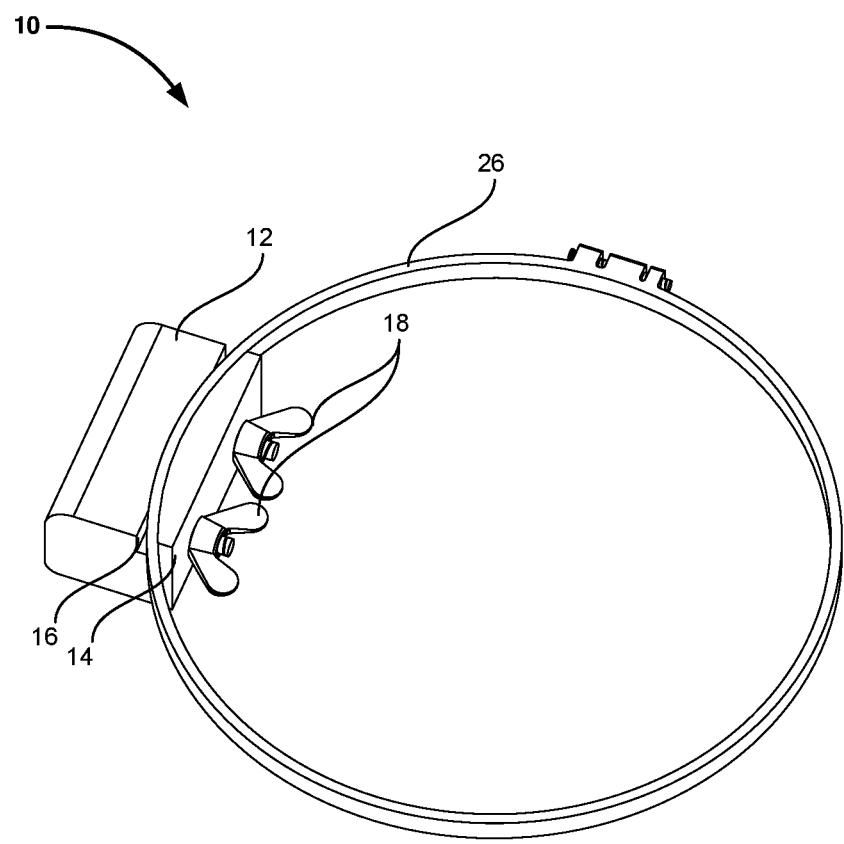
FIG. 1 illustrates an isometric view of a holder 10, wherein an embroider hoop 26 is observed mounted to a groove 16 between a first block 12 and a second block 14.
Figure 2:
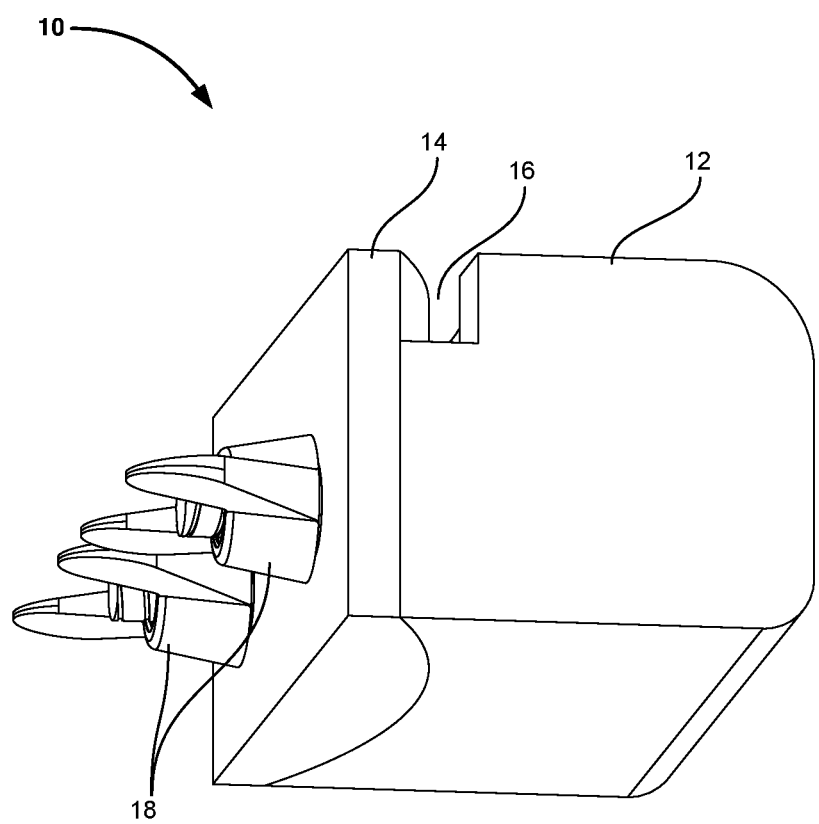
FIG. 2 illustrates an isometric bottom view of holder 10, in accordance with an embodiment of the present invention.
Figure 3:
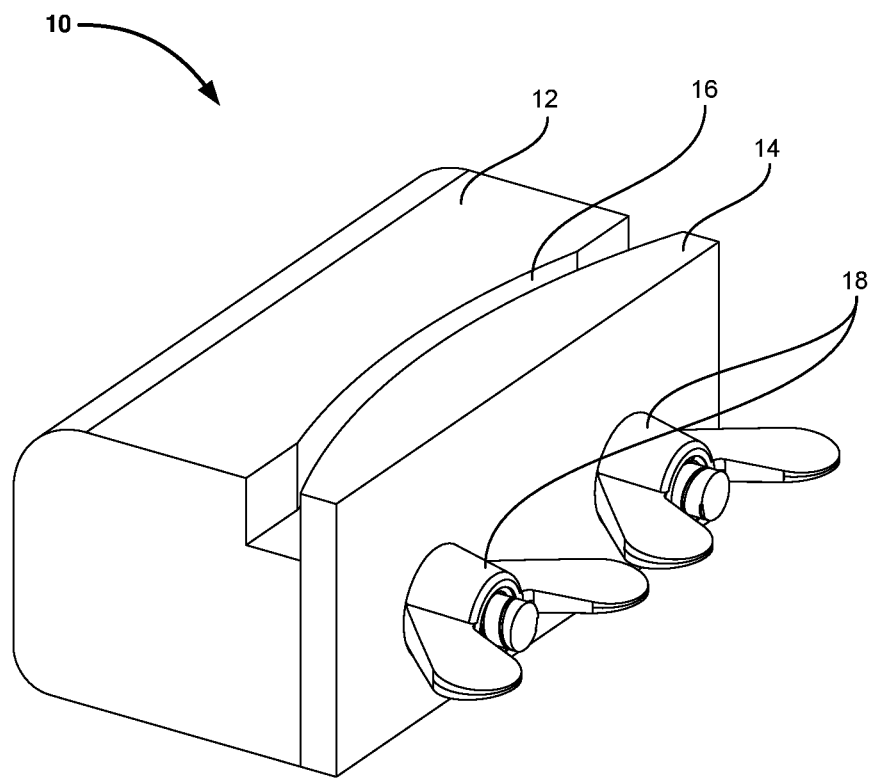
FIG. 3 illustrates an isometric top view of holder 10, in accordance with an embodiment of the present invention.
Figure 4:
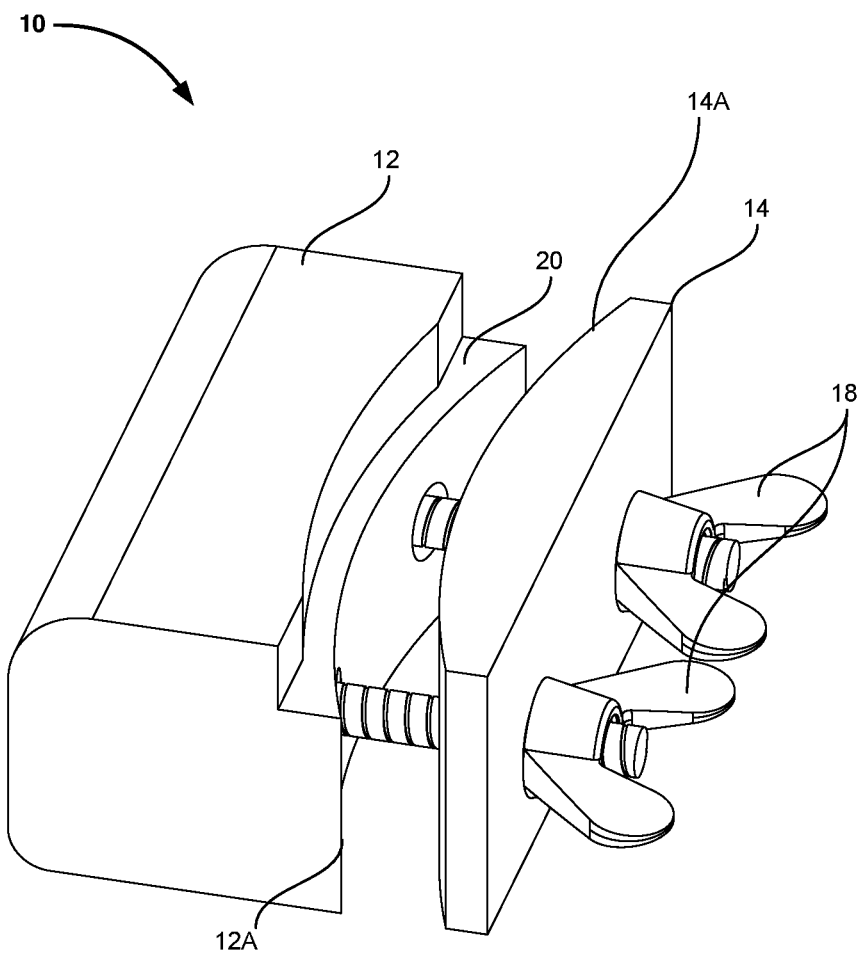
FIG. 4 illustrates another isometric view of holder 10, in accordance with an embodiment of the present invention.

Referring now to FIGS. 1 through 5, where the present invention is generally referred to with numeral 10, it can be observed that a holder 10, in accordance with an embodiment of the present invention, comprises a first block 12, a second block 14 fittable to first block 12, a groove 16 formed between first block 12 and second block 14 when second block 14 is fitted to first block 12, wherein groove 16 is configured to hold an article therewithin, and at least one fastener 18 for facilitating fitment of first block 12 and second block 14.

Holder 10 comprises first block 12. In accordance with an embodiment of the present invention, first block 12 has a first arcuate edge 12A. More specifically, the edge of first block 12 that interfaces with second block 14 for being fitted thereto has a curvature. At an operative top end of first arcuate edge 12A, a depression 20 is formed. Depression 20 facilitates the formation of groove 16 when first block 12 is assembled with second block 14.

Holder 10 comprises second block 14. Second block 14 has a second arcuate edge 14A. Second arcuate edge 14A has a configuration complementary to first arcuate edge 12A. More specifically, second arcuate edge 14A fits perfectly with first arcuate edge 12A so that the depression 20 facilitates the formation of groove 16 between first block 12 and second block 14.

First block 12 comprises a first pair of apertures 22 configured on first arcuate edge 12A. Second block 14A comprises a second pair of apertures 24. In an assembled configuration of first block 12 and second block in which first arcuate edge 12A interfaces second arcuate edge 14A, first pair of apertures 22 align with second pair of apertures 24.

In accordance with an embodiment of the present invention, holder 10 comprises a pair of fasteners 18. Pair of fasteners 18 are configured to be received within aligned first and second pair of apertures 22, 24. Pair of fasteners 18 facilitate a secure fitment of first and second block 12, 14 and thereby facilitating formation of groove 16 therebetween.

The thickness of groove 16 can be varied by the use of pair of fasteners 18. In accordance with an exemplary application of present invention, an embroidery hoop 26 can be supported within the groove 16.

It is to be noted that although groove 16 is shown to have a curved profile, the profile of groove 16 is not limited to being curved. Embroidery hoops, generally come in all shapes and sizes, and the profile of the groove 16 can therefore be configured for holding embroidery hoops of different shapes.

The holder 10, in accordance with an embodiment of the present invention, can hold an embroider hoop therein. Embroidery hoops hold the fabric taut when embroidery is being performed thereon. Performing embroidery on a fabric manually is a time intensive operation and may require the user to hold the hoop for hours at a time. Holding the hoop in the hand becomes cumbersome due to the small cross section of the hoop. This may cause immense discomfort as well as hand cramps to the user.

Holder 10, in accordance with the present invention, facilitates holding the hoop therein. The user can fit the hoop inside groove 16 and tighten pair of fasteners 18 until hoop is securely held between first and second blocks 12, 14. The user can then hold on to holder 10 instead of having to hold on the hoop for hours at a time. Holding on to holder 10 is relatively much easier and comfortable than simply holding on the hoop.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A holder comprising:
   a. a first block having a concave face, the concave face including a first arcuate edge, wherein said first arcuate edge has a depression formed at operative top end thereof, wherein said first block comprises a first pair of apertures located at said concave face, the depression being entirely above the concave face, the first pair of apertures providing access to channels, wherein said channels end within an interior of the first block, the first block including a gripping portion with a rectangular shape and having rounded edges, said gripping portion being located opposite the concave face;
   b. a second block adjacently mounted to said first block, said second block having a second arcuate edge, the second block including a convex face, the second block including a flat rectangular face opposite of said convex face;
   c. a groove formed between said first block and said second block when said second block is fitted to said first block, wherein said groove is configured to hold an article therewithin; and
   d. at least one fastener for facilitating fitment of said first block and said second block.

2. The holder according to claim 1, wherein said second block has a second arcuate edge.

3. The holder according to claim 2, wherein said second arcuate edge has a configuration complementary to that of said first arcuate edge.

4. The holder according to claim 3, wherein said depression on said first block facilitates formation of said groove when said second block is fitted to said first block.

5. The holder according to claim 1, wherein said second block comprises a second pair of apertures.

6. The holder according to claim 5, wherein said first pair of apertures and said second pair of apertures align in a fitted configuration of said first block and said second block.

7. The holder according to claim 6, further comprising a pair of fasteners configured to fit into the aligned said first and said second pair of apertures.

8. The holder according to claim 1, wherein an embroider hoop can be supported within said groove.

9. A holder comprising:
   a. a first block having a concave face including a first arcuate edge, wherein said first arcuate edge has a depression formed at operative top end thereof, wherein said first block comprises a first pair of apertures, the first pair of apertures providing access to channels, wherein said channels end within an interior of the first block, the first block including a gripping portion with a rectangular shape and having rounded edges, the depression being entirely above the concave face;
   b. a second block adjacently mounted to said first block, said second block having a second arcuate edge, the second block including a convex face, the second block including a flat rectangular face opposite of said convex face, wherein said second arcuate edge has a configuration complementary to that of said first arcuate edge, wherein said second block comprises a second pair of apertures;
   c. a groove formed between said first block and said second block when said second block is fitted to said first block, wherein said depression on said first block facilitates formation of said groove when said second block is fitted to said first block, the depression including an offset top edge that follows the curvature of the first arcuate edge, said offset top edge including two flattened ends, wherein said groove is configured to hold an article therewithin; and
   d. a pair of fasteners for facilitating fitment of said first block and said second block, wherein said first pair of apertures and said second pair of apertures align in a fitted configuration of said first block and said second block, and said pair of fasteners configured to fit into the aligned said first and said second pair of apertures, the pair of fasteners including a top end and a bottom end, said bottom end being received fully and retained within the channels of the first block.

10. A holder consisting of:
   a. a first block having a concave face, the concave face including a first arcuate edge, wherein said first arcuate edge has a depression formed at operative top end thereof, wherein said first block comprises a first pair of apertures located at said concave face, the depression being entirely above the concave face, the first pair of apertures providing access to channels, wherein said channels end within an interior of the first block, the first block including a gripping portion with a rectangular shape and having rounded edges, said gripping portion being located opposite the concave face; and
   b. a second block adjacently mounted to said first block, said second block having a second arcuate edge, the second block including a convex face, the second block including a flat rectangular face opposite of said convex face, wherein said second arcuate edge has a configuration complementary to that of said first arcuate edge, wherein said second block comprises a second pair of apertures; and c. a groove formed between said first block and said second block when said second block is fitted to said first block, wherein said depression on said first block facilitates formation of said groove when said second block is fitted to said first block, the depression including an offset top edge that follows the curvature of the first arcuate edge, said offset top edge including two flattened ends, wherein said groove is configured to hold an article therewithin; and d. a pair of fasteners for facilitating fitment of said first block and said second block, wherein said first pair of apertures and said second pair of apertures align in a fitted configuration of said first block and said second block, said pair of fasteners configured to fit into the aligned said first and said second pair of apertures, the pair of fasteners including a top end and a bottom end, said bottom end being received fully and retained within the channels of the first block.

* * * * *